United States Patent [19]

Jeon

[11] Patent Number: 5,883,610
[45] Date of Patent: Mar. 16, 1999

[54] GRAPHICS OVERLAY DEVICE

[75] Inventor: Byeonghwan Jeon, Kyungki-do, Rep. of Korea

[73] Assignee: Samsung Electronics Co., Ltd., Rep. of Korea

[21] Appl. No.: 735,179

[22] Filed: Oct. 22, 1996

[30] Foreign Application Priority Data

Dec. 15, 1995 [KR]  Rep. of Korea ...................... 95-50698

[51] Int. Cl.$^6$ ....................................................... G09G 3/02
[52] U.S. Cl. ........................ 345/113; 345/508; 345/511; 345/512; 345/509; 345/521
[58] Field of Search ..................... 345/113, 114, 345/508, 511, 512, 521, 522, 526, 509

[56] References Cited

U.S. PATENT DOCUMENTS

| | | | |
|---|---|---|---|
| 4,580,165 | 4/1986 | Patton et al. | 358/148 |
| 4,591,897 | 5/1986 | Edelson | 358/22 |
| 4,599,611 | 7/1986 | Bowker et al. | 340/721 |
| 4,800,423 | 1/1989 | Appiano et al. | 358/21 |
| 4,891,631 | 1/1990 | Fredlund et al. | 340/709 |
| 4,907,086 | 3/1990 | Truong | 358/183 |
| 5,027,212 | 6/1991 | Marlton et al. | 358/183 |
| 5,220,312 | 6/1993 | Lumelsky et al. | 340/721 |
| 5,293,483 | 3/1994 | Mizobata | 395/164 |
| 5,367,318 | 11/1994 | Beaudin et al. | 345/201 |
| 5,572,691 | 11/1996 | Koudmani | 395/405 |
| 5,587,726 | 12/1996 | Moffat | 345/201 |
| 5,594,467 | 1/1997 | Marlton et al. | 345/115 |
| 5,642,498 | 6/1997 | Kutner | 395/509 |

FOREIGN PATENT DOCUMENTS

| | | |
|---|---|---|
| 54-156420 | 12/1979 | Japan . |
| 57-10586 | 1/1982 | Japan . |
| 2 187 360 | 9/1987 | United Kingdom ............. H04N 5/45 |
| 2 267 202 | 11/1993 | United Kingdom ........... H04N 5/262 |

*Primary Examiner*—Mark K. Zimmerman
*Assistant Examiner*—Vincent E. Kovalick
*Attorney, Agent, or Firm*—Burns, Doane, Swecker & Mathis LLP

[57] ABSTRACT

There is disclosed a graphics overlay device for overlaying a video signal and a graphics signal and outputting the overlayed signal, the graphics overlay device including a frame memory for storing video data, a video address generator for generating a video address which designates an area of the frame memory to read therefrom or store therein, at least two graphics overlay memories for reading and writing graphics data alternatively by a predetermined period wherein the writing is performed on an area designated by a graphics address and the reading is performed on an area designated by the video address, a multiplexer for selecting and outputting graphics data output from one of graphics overlay memories, a look up table for overlaying the video data output from the frame memory and the graphics data output from the multiplexer and outputting the overlayed data, and a central processing unit for generating the graphics data which designates an area of the graphics overlay memories on which the graphics data is to be stored, and a select controlling signal which controls recording and reading operations of the graphics overlay memories, and a switching operation of the multiplexer.

2 Claims, 5 Drawing Sheets

GRAPHICS OVERLAY DEVICE

BACKGROUND OF THE INVENTION

The present invention relates to a graphics overlay device, and more particularly to a graphics overlay device with improved overlaying speed.

Referring to FIG. 1, a conventional graphics overlay device includes a frame memory 4 for storing video data generated from a closed circuit digital (CCD) camera 1 and converted into a digital signal by an analog-to-digital (A/D) converter 2, a graphics overlay memory (GOM) 10 for storing graphics data, a look up table (LUT) 5 for outputting graphics overlay data obtained from overlaying the graphics data output from the GOM 10 and the digital video data output from the frame memory 4, a digital-to-analog (D/A) converter 6 for converting the graphics overlay data into corresponding analog data, a monitor 7 for displaying the analog video signal output from the D/A converter 6, a video address generator 8 for generating a video address signal which designates a location of the frame memory 4 (or GOM 10) which the digital video data (or graphics data) is to be stored in or read from, and a central processing unit 9 for generating the graphics data, a graphics address signal which designates a location of the GOM 10 on which the graphics data is to be stored and a select controlling signal which controls the storing and reading operations in the GOM 10. Here, the graphics data may be generated from the central processing unit 9 or provided from an external source. Moreover, the frame memory 4 may perform recording and reading operations at the same time using a dual port RAM.

Referring to FIG. 2, the GOM 10 includes a multiplexer (MUX) 12 for receiving the video address and the graphics address and outputting one of the two addresses according to a select controlling signal output from the central processing unit 9, a memory 14 which the graphics data is read from or written in according to the output address of the multiplexer 12, a graphics data buffer 16 for buffering and outputting the graphics data output from the memory 14 to the LUT 5, and a data buffer 18 between the memory 14 and the CPU 9 for buffering the graphics data.

The graphics overlay memory 10 operates as follows. If the select controlling signal (SELECT) output from the CPU 9 is HIGH, the multiplexer 12 outputs a video address transmitted from the video address generator 8 and the memory 14 outputs the data in the area designated by the graphics address to the graphics data buffer 16. The buffer 16 buffers the graphics data output from the memory 14 and then outputs the same to the LUT 5 shown in FIG. 1. The LUT 5 overlays the graphics data and the video data output from the frame memory 4. The graphics overlay video data output from the LUT 5 is converted into a corresponding analog video signal by the D/A converter 6 and displayed on the monitor 7.

If the select controlling signal (SELECT) output from the CPU 9 is LOW, the multiplexer 12 outputs a graphics address transmitted from the CPU 9 and the memory 14 stores the graphics data transmitted from the data buffer 18 in the location designated by the graphics address, thus renewing the contents of the memory 14.

FIG. 3 shows a horizontal sync signal for illustrating the read/write timing of the memory 14 shown in FIG. 2. The graphics data is read from the memory 14 during an effective scanning period A of the horizontal sync signal and recorded in the memory 14 during a horizontal blanking period B. Here, with the NTSC standard employed, the effective horizontal scanning period A is about 53 $\mu$s and the horizontal blanking period B is about 10 $\mu$s.

As shown in FIG. 3, because the graphics data is recorded in the memory 14 only during the horizontal blanking period B, a conventional graphics overlay device has a problem in that the graphics image flickers or the overlaying speed is lower when the graphics data is too large to be sufficiently recorded during the horizontal blanking period B.

SUMMARY OF THE INVENTION

With a view to remove or reduce the above problem, an object of the present invention is to provide a graphics overlay device for use with large graphics data or rapidly changing graphics images.

To achieve the above object, there is provided a graphics overlay device for overlaying a video signal and a graphics signal and outputting the overlayed signal, the graphics overlay device including a frame memory for storing video data, a video address generator for generating a video address which designates an area of the frame memory to read therefrom or store therein, at least two graphics overlay memories for reading and writing graphics data alternatively by a predetermined period wherein the writing is performed on an area designated by a graphics address and the reading is performed on an area designated by the video address, a multiplexer for selecting and outputting graphics data output from one of graphics overlay memories, a look up table for overlaying the video data output from the frame memory and the graphics data output from the multiplexer and outputting the overlayed data, and a central processing unit for generating the graphics data which designates an area of the graphics overlay memories on which the graphics data is to be stored, and a select controlling signal which controls recording and reading operations of the graphics overlay memories, and a switching operation of the multiplexer.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
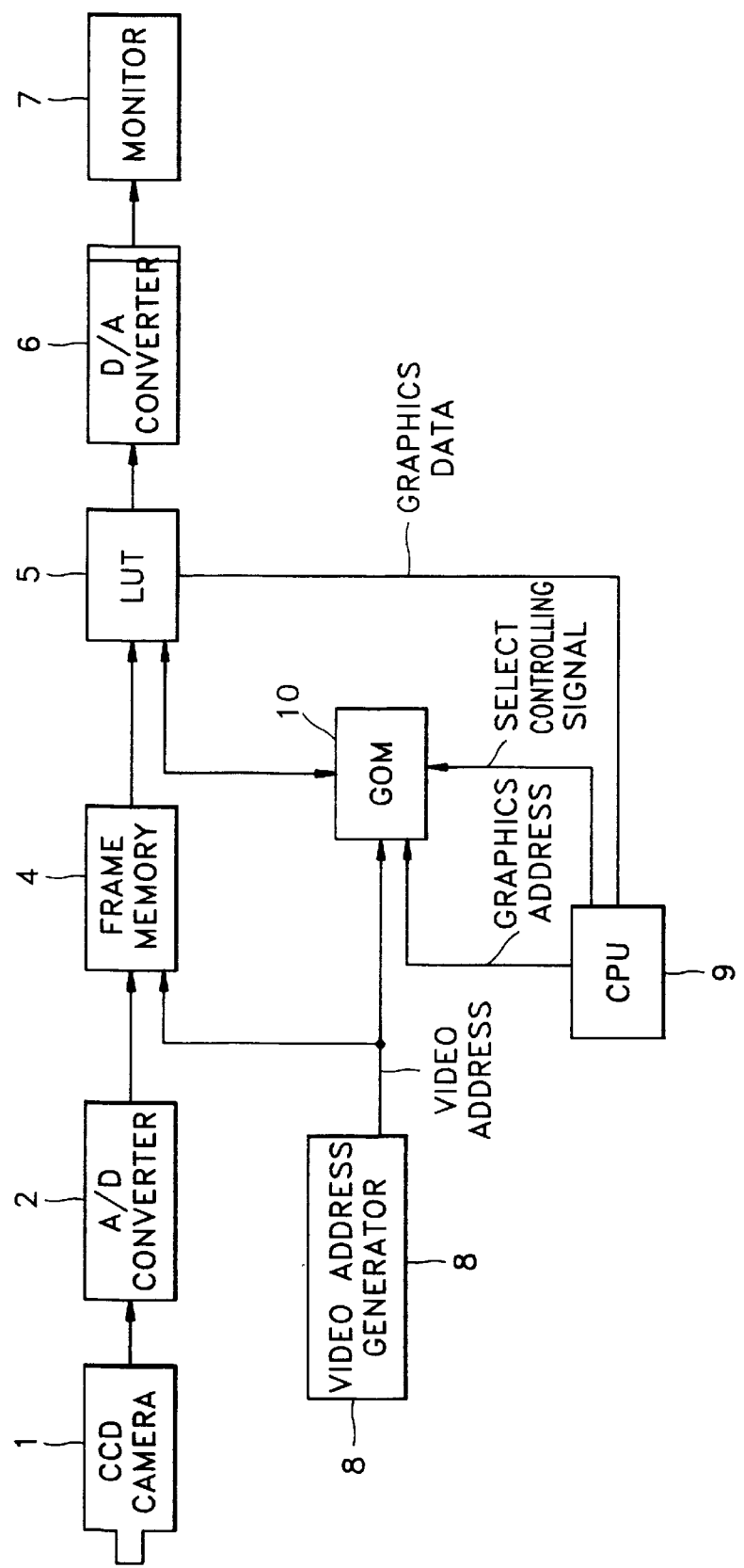
FIG. 1 is a block diagram showing a conventional graphics overlay device.
Figure 2:
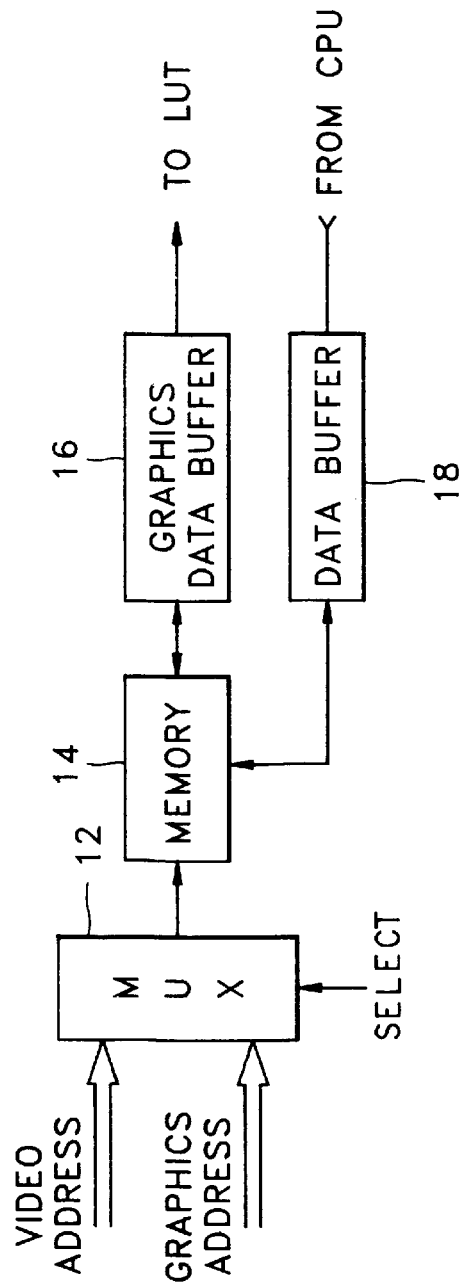
FIG. 2 is a block diagram showing the detailed structure of the graphics overlay memory shown in FIG. 1.
Figure 4:
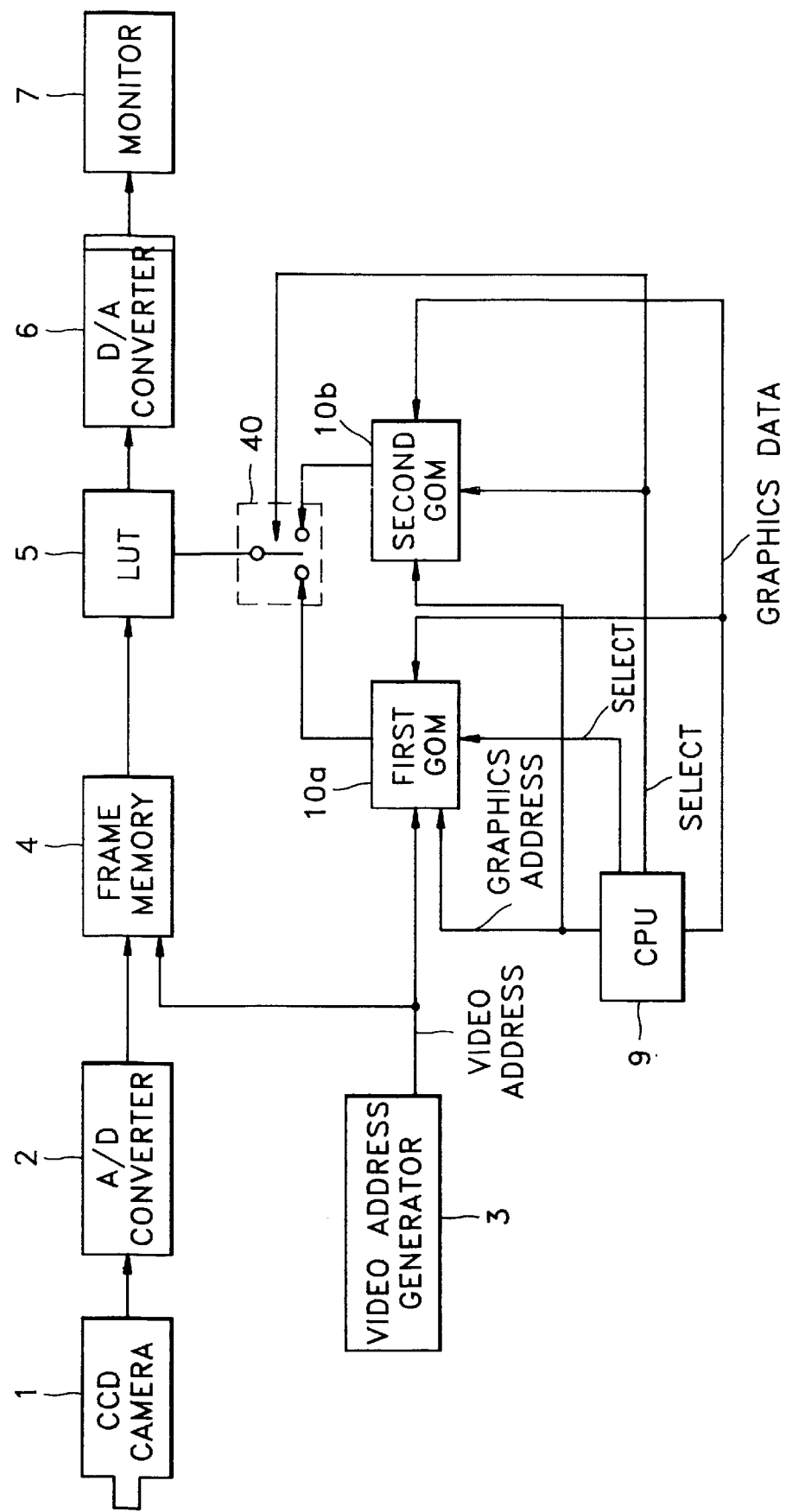
FIG. 4 is a block diagram showing a graphics overlay device according to an embodiment of the present invention.

FIG. 4 is a block diagram showing a graphics overlay device according to an embodiment of the present invention, in which elements performing the equivalent functions as those of FIG. 1 have the same reference numerals, comprising a frame memory 4 for storing digital video data transmitted from a charge-coupled device (CCD) camera 1 via an analog-to-digital (A/D) converter 2, graphics overlay memories (GOMs) 10a and 10b for storing graphics data, a multiplexer 40 for selecting graphics data output from one of the graphics overlay memories 10a and 10b and transmitting to a look-up table (LUT) 5, a LUT 5 for overlaying the video data output from the frame memory 4 and the graphics data output from the multiplexer 40 and then outputting it as a graphics overlay video data, a video address generator 3 for generating a video address signal which designates an area of the frame memory 4 which the video data is to be stored in or read from or an area on GOM 10a (or GOM 10b) from which the graphics data is to be read, a central processing unit 9 for generating a graphics address signal which designates an area on each GOM 10a or 10b on which the graphics data is recorded, transmitting the graphics data provided from an external source to the GOM 10a or 10b, and generating a select controlling signal (SELECT) which controls the storing and reading operations of the GOMs 10a and 10b.

The graphics overlay video data output from the LUT 5 is converted into corresponding analog data by a digital-to-analog (D/A) converter 6 and then displayed on a monitor 7.

Figure 5:
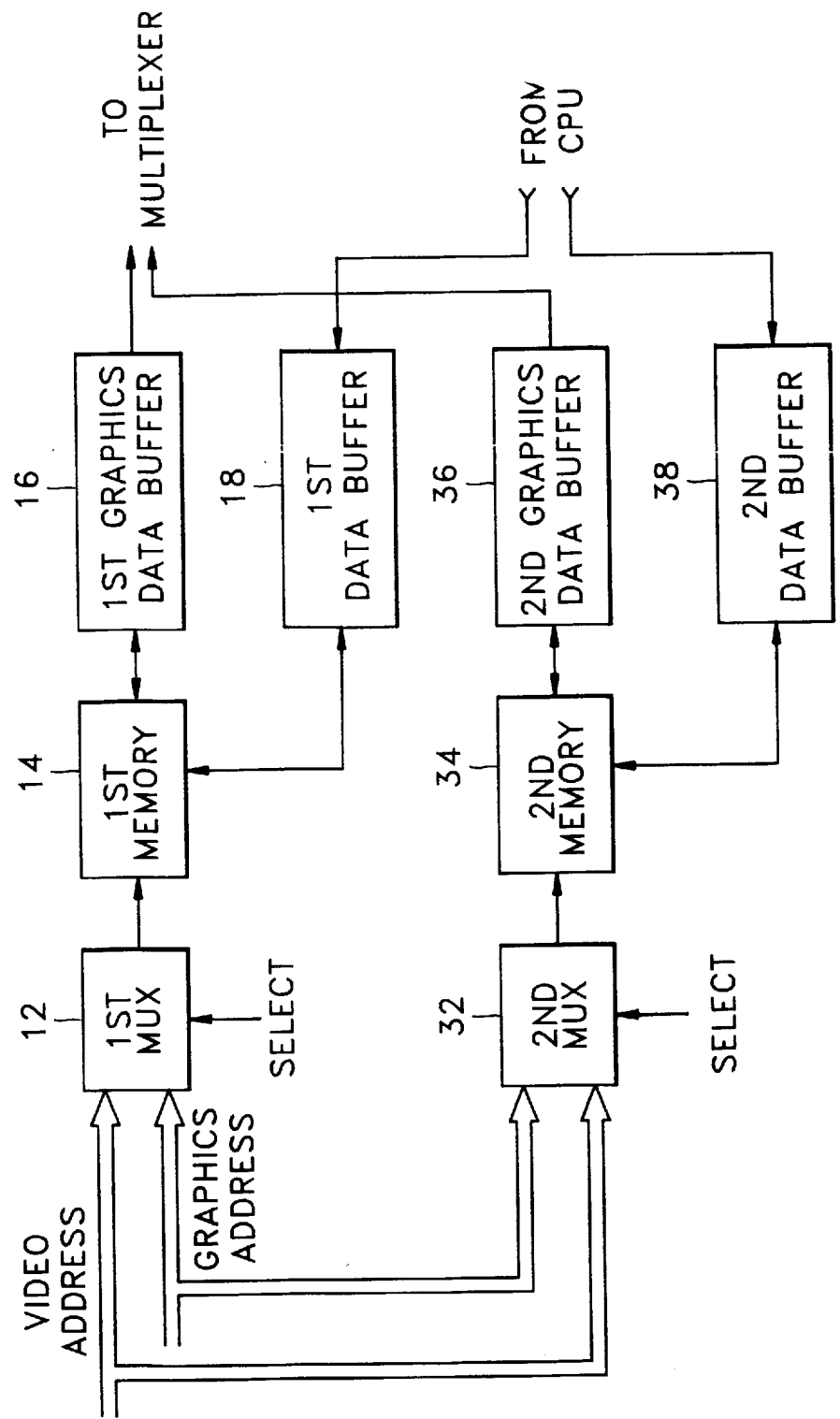
FIG. 5 is a block diagram showing the detailed structure of the graphics overlay memory shown in FIG. 4.

FIG. 5 shows a detailed structure of the first graphics overlay memory 10a and the second graphics overlay memory 10b, which includes multiplexers (MUXs) 12 and 32 for outputting one of either the video address or the graphics address according to the select controlling signal (SELECT) output from the central processing device 9, memories 14 and 34 for reading and writing the graphics data according to the addresses output from the MUXs 12 and 32, respectively, graphics data buffers 16 and 36 for buffering the graphics data output from the memories 14 and 34 and transmitting to the multiplexer 40, respectively, and data buffers 18 and 38 between the memories 14 and 34 and the central processing unit 9 for buffering the graphics data, respectively.

In the graphics overlay device shown in FIG. 5, if the select controlling signal (SELECT) transmitted from the CPU 9 is HIGH, the first MUX 12 outputs the video address transmitted from the video address generator 3, and the first memory 14 transmits the data on a location designated by the video address to the first graphics data buffer 16. The graphics data output from the first memory 14 is buffered in the first graphics data buffer 16 and output to the LUT 5 via the MUX 40. The LUT 5 overlays the video data output from the first memory 14 and the graphics data output from the first graphics data buffer 18.

Meanwhile, the second MUX 32 selects and outputs the graphics address transmitted from the CPU 9 for output. The second memory 34 records the graphics data transmitted from the second data buffer 38 in an area designated by the graphics address, thus renewing the contents of the second memory 34.

On the contrary, if the select controlling signal (SELECT) transmitted from the CPU 9 is LOW, the first multiplexer 12 outputs the graphics address transmitted from the CPU 9 and the first memory 14 stores the graphics data transmitted from the first data buffer 18 in an area designated by the graphics address, thus renewing the contents of the first memory 14.

The second MUX 32 outputs the video address transmitted from the video address generator 3 and the second memory 34 transmits the graphics data in the area designated by the video address to the second graphics data buffer 36.

The graphics data output from the second memory 34 is buffered in the second graphics data buffer 36 and output to the LUT 5 via the MUX 40.

The look up table 5 overlays the video data output from the frame memory 4 and the graphics data output from the MUX 40. The graphics overlay video data output from the LUT 5 is converted to corresponding analog data by the digital-to-analog converter 6 and then displayed on a monitor 7.

The operation of the device shown in FIGS. 4 and 5 will be described in greater detail as follows.

An analog video signal output from the CCD camera 21 is converted into corresponding digital video data by the A/D converter 2 and then stored in the frame memory 4. The video data output from the frame memory 4 enters the LUT 5. The LUT 5 overlays the video data transmitted from the frame memory 4 and the graphics data transmitted from the MUX 40 and then outputs the overlayed data to the D/A converter 6. The D/A converter 6 converts the graphics overlay video data in which the video data and the graphics data are overlayed into the corresponding analog video signal.

The MUX 40 alternately switches between the GOMs 10a and 10b in response to the select controlling signal (SELECT) output from the CPU 9 with a predetermined period.

If the MUX 40 selects the output from the first GOM 10a, the graphics data stored in the first GOM 10a is output to the LUT 5, and graphics data is recorded on the second GOM 10b.

On the contrary, if the multiplexer 40 selects the output from the second GOM 10b, the graphics data stored in the second GOM 10b is output to the LUT 5 and graphics data is recorded on the first GOM 10.

The switching between the first and second overlay memories 10a and 10b is controlled by the CPU 9 and the switching is performed during the horizontal blanking period B, to prevent spots from occurring on a screen due to a switching noise at the switching point.

If the signal output from the first MUX 12 shown in FIG. 5 is a video address, the first memory 14 outputs the graphics data stored therein to the first graphics data buffer 16. On the contrary, if the signal output from the first MUX 12 is a graphics address, the first memory 14 stores therein the graphics data transmitted from the first data buffer 18.

If the signal output from the second MUX 32 shown in FIG. 5 is a video address, the second memory 34 outputs the graphics data stored therein to the second graphics data buffer 36. On the contrary, if the signal output from the second MUX 32 is a graphics address, the second memory 34 stores therein the graphics data transmitted from the second data buffer 38.

Figure 6:
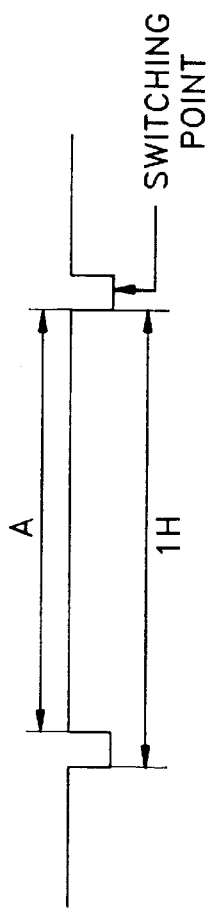
FIG. 6 is a timing diagram illustrating the operation of the graphics overlay device shown in FIG. 4.

Referring to FIG. 6, the graphics data is stored in the memories 14 and 34 during the effective scanning period A of the horizontal sync signal.

Figure 3:
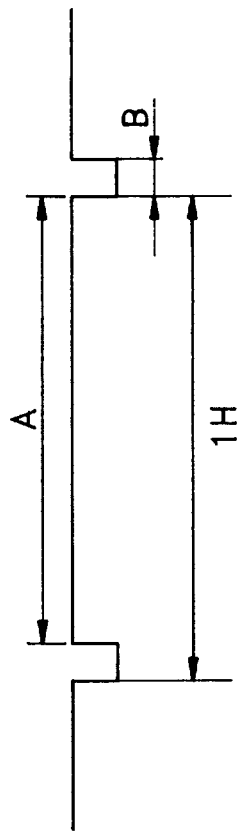
FIG. 3 is a timing diagram illustrating the operation of the graphics overlay memory shown in FIG. 1.

Compared with FIG. 3, because the graphics data is stored in the GOMs 10a and 10b. during the effective horizontal scanning period A which is longer than the horizontal blanking period B, more graphics data can be recorded during the same time in comparison with the device shown in FIG. 1.

Here, the same graphics data is alternately recorded on both GOMs 10a and 10b during successive two periods of the horizontal sync signal. That is, if graphics data is recorded on the first GOM 10a during the first horizontal sync period, the same graphics data is also recorded on the second GOM 10b during the second horizontal sync period, thereby displaying a continuous graphics image on a screen even when the first and second GOMs 10 and 30 are switched.

In another embodiment, recording can be performed by overlapping the first and second GOMs 10a and 10b.

Figure 7:
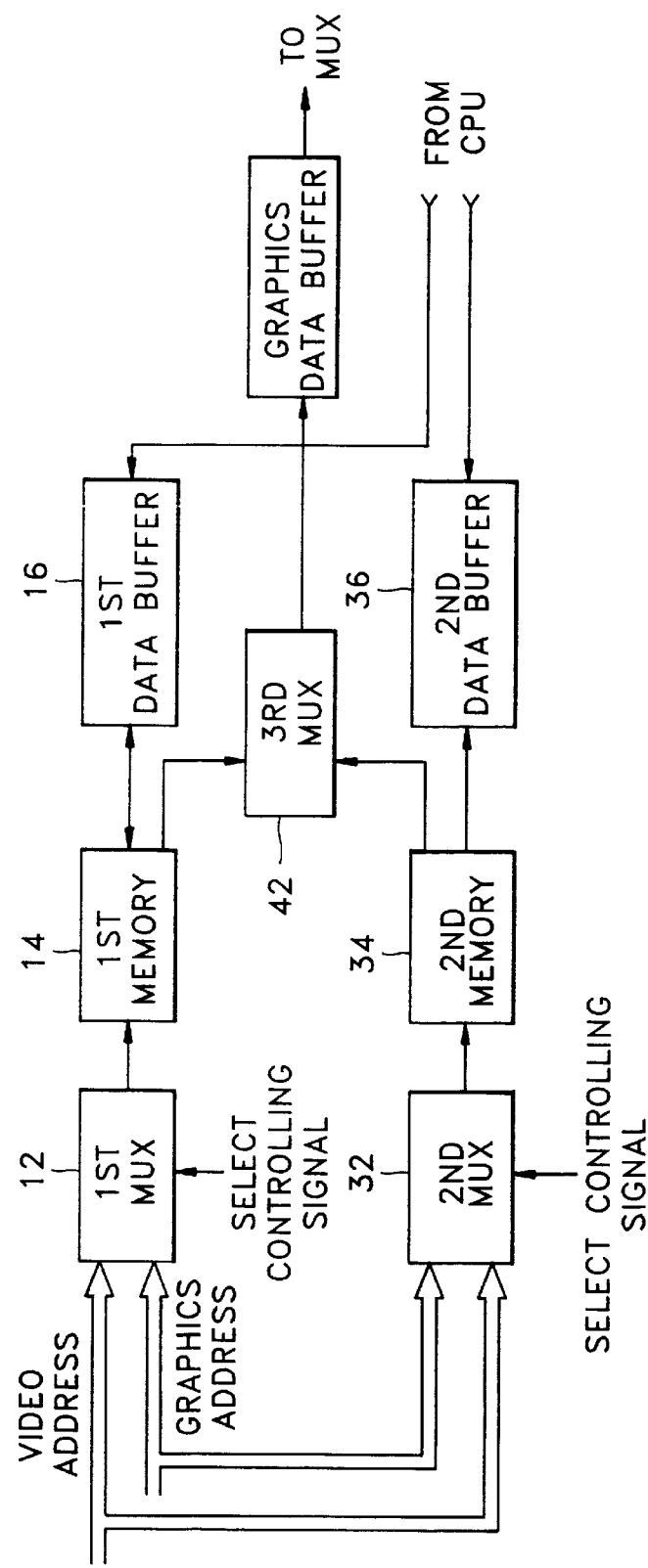
FIG. 7 is a block diagram of a graphics overlay device according to another embodiment of the present invention.

FIG. 7 shows a graphics overlay device according to another embodiment of the present invention, wherein elements performing the equivalent functions as those of FIGS. 4 and 5 have the same reference numerals.

Compared to the device shown in FIGS. 4 and 5, the graphics overlay device shown in FIG. 7 has a third MUX 42, instead of the MUX 40, for outputting the graphics data transmitted from one of the memories 14 and 34, and only one graphics data buffer.

The graphics data output from the third MUX 42 is buffered in the graphics data buffer 16 and then transmitted to the LUT 5 via the MUX 40 (see FIG. 4).

As described above, according to the graphics overlay device according to an embodiment of the present invention, graphics data is stored in and read from a plurality of graphics overlay memories, alternately, and thereby the movement of the graphics image can be rapidly displayed.

Thus, graphics images which move rapidly on a screen, such as an arrow controlled by a mouse connected to a computer, can be shown at high speed, and the movement of graphics image such as in animation can be rapidly displayed.

What is claimed is:

1. A graphic overlay device for overlaying a video signal and a graphics signal and outputting the overlayed signal, said graphics overlay device comprising:

a frame memory for storing video data;

a video address generator for generating a video address which designates an area of said frame memory to read therefrom or store therein;

at least two graphics overlay memories for reading and writing graphics data alternatively by a predetermined period, wherein said writing is performed on an area designated by a graphics address and said reading is performed on an area designated by said video address;

a multiplexer for selecting and outputting graphics data output from one of the graphics overlay memories;

a look up table for overlaying the video data output from said frame memory and the graphics data output from said multiplexer and outputting the overlayed data; and a central processing unit for generating said graphics data, said graphics address for designating an area of said graphics overlay memories on which said graphics data is to be stored, and a select controlling signal which controls recording and reading operations of said graphics overlay memories, and a switching operation of said multiplexer;

wherein each of said graphics overlay memory comprises:

a multiplexer for multiplexing between said video address and said graphics address in response to said select controlling signal generated from said central processing unit;

a memory for reading and writing said graphics data transmitted from said central processing unit in response to said address selected by said multiplexer;

a graphics data buffer for buffering the graphics data output from said memory and outputting the same to said look up table; and a data buffer for buffering the graphics data output from said central processing unit and transmitting the same to said memory.

2. A graphic overlay device for overlaying a video signal and a graphics signal and outputting the overlayed signal, said graphics overlay device comprising:

a frame memory for storing video data;

a video address generator for generating a video address which designates an area of said frame memory to read therefrom or store therein;

at least two graphics overlay memories for reading and writing graphics data alternatively by a period of a horizontal sync signal, wherein said writing is performed on an area designated by a graphics address and said reading is performed on an area designated by said video address, and wherein the same graphics data is recorded on each of said graphics overlay memories during subsequent periods of said horizontal sync signal, respectively;

a multiplexer for selecting and outputting graphics data output from one of the graphics overlay memories;

a look up table for overlaying the video data output from said frame memory and the graphics data output from said multiplexer and outputting the overlayed data; and a central processing unit for generating said graphics data, said graphics address for designating an area of said graphics overlay memories on which said graphics data is to be stored, and a select controlling signal which controls recording and reading operations of said graphics overlay memories, and a switching operation of said multiplexer.

* * * * *